(12) United States Patent
Alexiou et al.

(10) Patent No.: US 11,198,103 B2
(45) Date of Patent: Dec. 14, 2021

(54) TWO-LAYER NANOFILTRATION MEMBRANES

(71) Applicant: Trustees of Tufts College, Medford, MA (US)

(72) Inventors: Ayse Asatekin Alexiou, Arlington, MA (US); Ilin Sadeghi, Arlington, MA (US)

(73) Assignee: Trustees of Tufts College, Medford, MA (US)

( * ) Notice: Subject to any disclaimer, the term of this patent is extended or adjusted under 35 U.S.C. 154(b) by 0 days.

(21) Appl. No.: 15/556,124

(22) PCT Filed: Mar. 8, 2016

(86) PCT No.: PCT/US2016/021298
§ 371 (c)(1),
(2) Date: Sep. 6, 2017

(87) PCT Pub. No.: WO2016/144926
PCT Pub. Date: Sep. 15, 2016

(65) Prior Publication Data
US 2018/0043315 A1     Feb. 15, 2018

Related U.S. Application Data

(60) Provisional application No. 62/131,001, filed on Mar. 10, 2015.

(51) Int. Cl.
*B01D 71/76* (2006.01)
*B01D 61/02* (2006.01)
(Continued)

(52) U.S. Cl.
CPC ........... *B01D 71/76* (2013.01); *B01D 61/027* (2013.01); *B01D 69/02* (2013.01); *B01D 69/12* (2013.01);
(Continued)

(58) Field of Classification Search
CPC ........ B01D 71/76; B01D 69/02; B01D 71/44; B01D 61/027; B01D 69/12; B01D 71/32;
(Continued)

(56) References Cited

U.S. PATENT DOCUMENTS 4,666,991 A * 5/1987 Matsui .................. B01D 69/12
525/276
6,916,488 B1 * 7/2005 Meier .................. A61K 9/5146
424/1.21
(Continued)

FOREIGN PATENT DOCUMENTS

KR     10-2014-0082526          7/2014
WO        WO-9830318 A2 *   7/1998    ......... B01D 67/0006
(Continued)

OTHER PUBLICATIONS

Control of Size and Charge Selectivity in Amphiphilic Graft Copolymer Nanofiltration Membranes by Nathan Lovell Thesis MIT (109 pgs) (Year: 2010).*
(Continued)

*Primary Examiner* — Pamela H Weiss
(74) *Attorney, Agent, or Firm* — Foley Hoag LLP; Dana M. Gordon

(57) ABSTRACT

A two-layer membrane including a polymer layer and a support layer, the polymer layer being disposed on a surface of the support layer. The polymer layer, having a pore size of at most 50 nm and a thickness of 5 nm to 10 μm, is formed of an amphiphilic copolymer that contains both charged groups and hydrophobic groups. The support layer has a pore size of 3 nm to 10 μm, which is larger than the pore size of the polymer layer. Also disclosed is a process of filtering a liquid using the two-layer membrane described above.

20 Claims, 5 Drawing Sheets

(51) Int. Cl.
*B01D 69/12* (2006.01)
*B01D 71/32* (2006.01)
*B01D 69/02* (2006.01)
*B01D 71/44* (2006.01)
*C02F 1/44* (2006.01)
*C02F 101/10* (2006.01)
*C02F 101/12* (2006.01)
*C02F 101/30* (2006.01)

(52) U.S. Cl.
CPC ............ *B01D 71/32* (2013.01); *B01D 71/44* (2013.01); *C02F 1/442* (2013.01); *B01D 2325/02* (2013.01); *B01D 2325/04* (2013.01); *B01D 2325/20* (2013.01); *B01D 2325/28* (2013.01); *B01D 2325/34* (2013.01); *B01D 2325/36* (2013.01); *B01D 2325/38* (2013.01); *C02F 2101/10* (2013.01); *C02F 2101/101* (2013.01); *C02F 2101/12* (2013.01); *C02F 2101/308* (2013.01)

(58) Field of Classification Search
CPC ............ B01D 2325/02; B01D 2325/38; B01D 2325/34; B01D 2325/36; B01D 2325/04; B01D 2325/20; B01D 2325/28; C02F 1/442; C02F 2101/10; C02F 2101/101; C02F 2101/308; C02F 2101/12
See application file for complete search history.

(56) References Cited

U.S. PATENT DOCUMENTS

| | | | | |
|---|---|---|---|---|
| 8,367,809 B2* | 2/2013 | Childs | ............... | B01J 47/018 435/117 |
| 8,505,745 B2* | 8/2013 | Mayes | ............... | B01D 67/0093 210/490 |
| 8,562,836 B2* | 10/2013 | Mayes | ............... | B01D 67/0018 210/650 |
| 2006/0096922 A1* | 5/2006 | Gin | ............... | B01D 67/0006 210/650 |
| 2011/0198288 A1* | 8/2011 | Mayes | ............... | B01D 67/0093 210/650 |
| 2011/0305872 A1* | 12/2011 | Li | ............... | A61L 29/06 428/141 |
| 2011/0305881 A1* | 12/2011 | Schultz | ............... | A61L 33/027 428/195.1 |
| 2013/0015071 A1 | 1/2013 | Willis et al. | | |

FOREIGN PATENT DOCUMENTS

| | | |
|---|---|---|
| WO | WO 2014/023379 | 2/2014 |
| WO | WO 2014/079538 | 5/2014 |
| WO | WO 2014/139977 | 9/2014 |

OTHER PUBLICATIONS

Zhou, et al., "New Type of Membrane Material for Water Desalination Based on a Cross-Linked Bicontinuous Cubic Lyotropic Liquid Crystal Assembly", J. Am. Chem. Soc. 2007, 129, 9574-9575.

Sadeghi et al., "Spontaneous Self-Assembly and Micellization of Random Copolymers in Organic Solvents," Macromol. Chem. Phys., 218: 1700226 (2017).

* cited by examiner

TWO-LAYER NANOFILTRATION MEMBRANES

CROSS REFERENCE TO RELATED APPLICATIONS

This application is the National Stage of International Application No. PCT/US2016/021298, filed on Mar. 8, 2016, which claims the benefit of U.S. Provisional Application No. 62/131,001, filed on Mar. 10, 2015. The contents of both applications are hereby incorporated by reference in their entirety.

BACKGROUND OF THE INVENTION

Nanofiltration, a low pressure-driven (5-40 bar) filtration process, has separation characteristics between reverse osmosis and ultrafiltration.

Nanofiltration membranes show higher fluxes and consume less energy compared with reverse osmosis membranes and, as such, they have received much attention for their unique applications in many areas including, among others, wastewater treatment, water softening, pharmaceuticals, and food industry.

Currently, selective nanofiltration membrane layers are in general formed of cross-linked polyamides. These selective layers have low permeability, which increase energy requirements, and are susceptible to fouling, which leads to poor performance and shortened life. Furthermore, they have poor chlorine resistance and low chemical and thermal stability.

There is a need to develop high performance nanofiltration membranes that do not have the drawbacks listed above.

SUMMARY OF THE INVENTION

The present invention relates to a two-layer nanofiltration membrane containing an amphiphilic copolymer for filtering a liquid. The two-layer membrane exhibits an unexpectedly high water permeance. It also exhibits unexpectedly high salt and dye rejection, and high resistance to fouling.

In one aspect, this invention is a two-layer membrane that includes a polymer layer and a support layer, the polymer layer being disposed on a surface of the support layer. The polymer layer, having a pore size of at most 50 nm on average and a thickness of 5 nm to 10 µm, is formed of an amphiphilic copolymer containing, among others, two types of repeat units in a random order, wherein the first type of repeat unit formed of one or more monomers has one or more charged groups that allow for permeation of a liquid through the polymer layer and impart selectivity of solutes in the liquid, and the second type of repeat unit formed of one or more monomers has one or more hydrophobic groups that serve to prevent dissolution of the polymer layer in the liquid and also impart selectivity of solutes in the liquid. The support layer has a pore size of 3 nm to 10 µm, which is larger than the pore size of the polymer layer.

An example of the amphiphilic copolymer has a molecular weight of 20000 to 3000000 daltons (e.g., at least 40000 daltons). Preferably, the amphiphilic copolymer has a molecular weight of at least 100000 daltons. The polymer layer has a thickness of 5 nm to 10 µm, preferably below 5 µm, even more preferably below 1 µm, and a pore size of at most 50 nm, e.g., at most 30 nm and at most 10 nm.

The polymer layer can be deposited onto the support layer by dissolving the amphiphilic copolymer in a solvent to form a solution, coating the support layer by spreading the solution onto it to obtain a polymer-coated membrane, and immersing the polymer-coated membrane into water to coagulate the polymer layer. An example of the solvent is methanol.

Typically, in the solvent the amphiphilic copolymer forms micelles having an average size of 5-200 nm. Upon coating and immersing into water, these micelles are packed side-by-side to form negatively charged pores.

The amphiphilic copolymer can further be mixed before or during the formation of the selective layer with a metal salt having a singly, doubly, or triply charged ion or an organic compound for interacting with the one or more charged groups, e.g., a Van Der Waals force or a hydrogen bonding. Examples of the metal salt include a copper salt, a calcium salt, a magnesium salt, an iron salt, a silver salt, an aluminum salt, and a cadmium salt. Examples of the organic compound include a diamine and a polyamine.

The one or more charged groups in the first type of repeat unit can be carboxylic acid, sulfonic acid, phosphate, amine, or a combination thereof. In one embodiment, the first type of repeat unit is formed of methacrylic acid.

The second type of repeat unit can be formed of one or more acrylates, styrenes, acrylonitriles, or methyl styrenes. Preferably, the acrylates are trifluoroethyl methacrylate or methyl methacrylate.

In general, the two-layer membrane of this invention has a pure water permeance of 0.1 to 50 $Lm^{-2}h^{-1}bar^{-1}$, a NaCl rejection of 20 to 99.9%, a $Na_2SO_4$ rejection rate of 50 to 99.9%, a negative dye rejection of 50 to 100%, and a molecular weight cut-off below 30000 daltons. In one embodiment, the two-layer membrane contains a copper salt and has a pure water permeance of 1 to 50 $Lm^{-2}h^{-1}bar^{-1}$, a NaCl rejection of at least 70%, a $Na_2SO_4$ rejection of at least 80%, a negative dye rejection of at least 75%, and a molecular weight cut-off of 10000 daltons or less. Furthermore, the two-layer membrane of this invention rejects charged solutes, e.g., dyes, vitamins, and pharmaceutical compounds, at higher rates than electrically neutral solutes of similar sizes.

In another aspect, this invention is a process for filtering a liquid using the two-layer membrane described above. The process includes directing a liquid through such a membrane, first through the polymer layer and then through the support layer; and collecting the liquid that permeates through the membrane.

The details of the invention are set forth in the description below. Other features, objects, and advantages of the invention will be apparent from the following drawing and detailed description of several embodiments, and also from the appending claims.

DETAILED DESCRIPTION

Figure 1:
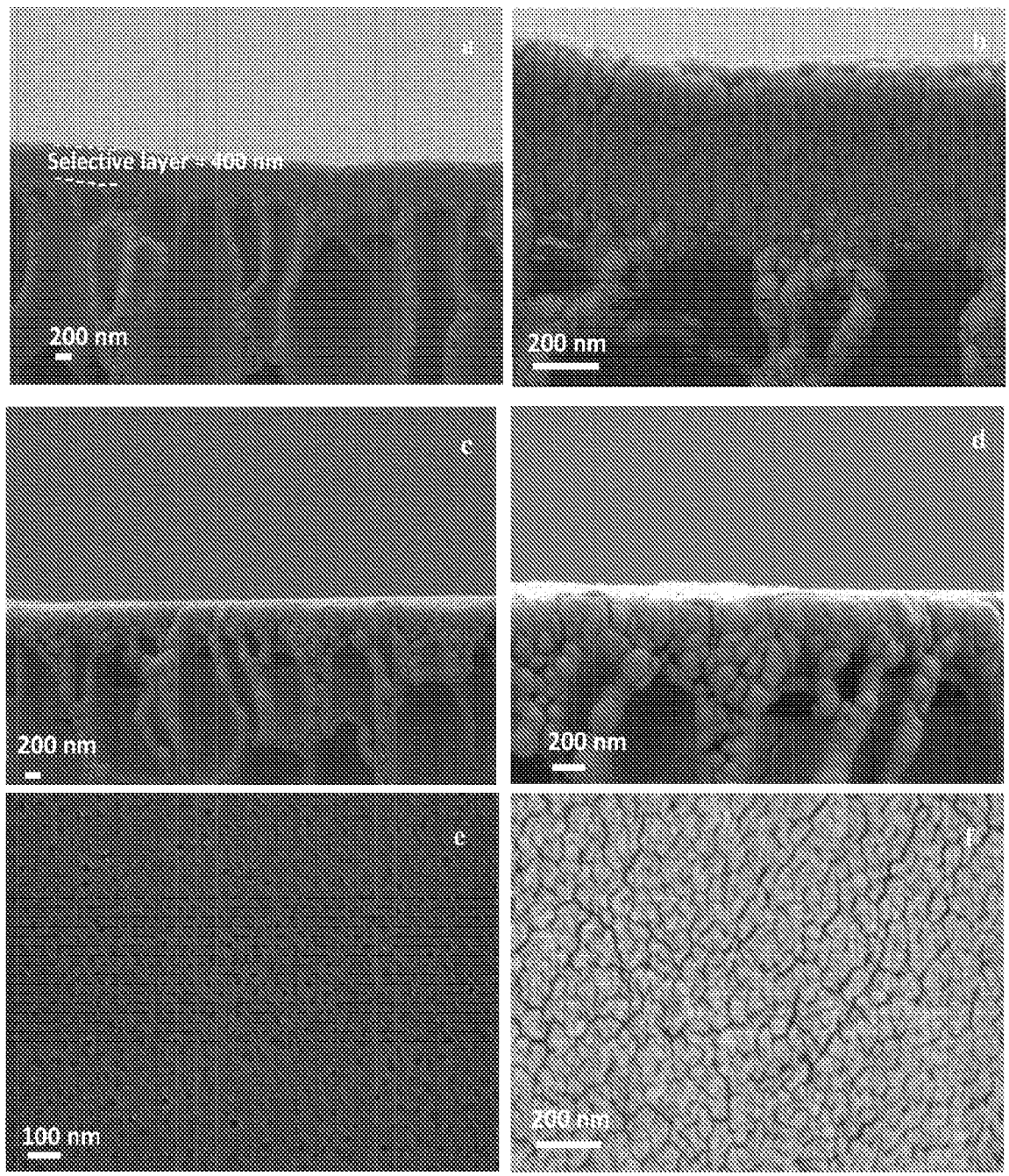
FIG. 1 shows images of (a) a coated membrane having a selective layer made from copolymer CP40, (b) the selective layer of the coated membrane in higher magnification, (c) base membrane PAN 400 (i.e., a support layer), (d) base membrane PAN 400 in higher magnification, (e) the surface of the coated membrane, and (f) the surface of base membrane PAN 400.

Within this invention is a two-layer nanofiltration membrane for filtering a liquid that includes a polymer layer and a support layer, wherein the polymer layer, formed of an amphiphilic copolymer, is deposited on a surface of the support layer. The two-layer membrane, i.e., a thin film composite membrane, can be used in both nanofiltration and ultrafiltration.

The amphiphilic copolymer contains at least two types of repeat units that are in a roughly random order dictated by polymerization statistics (as opposed to in long blocks). The first type of repeat unit has one or more charged groups that allow for permeation of a liquid through the polymer layer and impart selectivity of solutes in the liquid, and the second type of repeat unit has one or more hydrophobic groups that serve to prevent dissolution of the polymer layer in the liquid and also impart selectivity of solutes in the liquid. Importantly, the second type of repeat unit is more hydrophobic than the first type of repeat unit.

The first type of repeat unit contains one or more charged groups. Of note, in this repeat unit, the number of positively charged groups and the number of negatively charged groups are not equal, resulting in an overall non-zero electrostatic charge.

Preferably, the second type of repeat unit corresponds to a homopolymer of the same repeat unit having a glass transition temperature above an operating temperature, namely, the temperature of membrane use, e.g., room temperature.

The amphiphilic copolymer can be synthesized by well-known methods, e.g., free radical polymerization. It typically has a molecular weight of 20000 daltons or higher, preferably 40000 daltons or higher, more preferably 100000 daltons or higher.

The amphiphilic copolymer can be coated onto a support layer also by well-known methods, e.g. doctor blade coating and spray coating. The support layer is typically a porous membrane for use in ultrafiltration (pore size 3-100 nm) or microfiltration (pore size 100 nm-10 μm).

When dissolved in a solvent to be used for coating, the amphiphilic copolymer can form spherical micelles resulting from the significant differences of the hydrophilicity or hydrophobicity between the two types of repeat units described above. These micelles can be identified by various methods well known in the field, such as dynamic light scattering (DLS) and transmission electron microscopy (TEM). The average size of the micelles is 5-200 nm, e.g., 5-50 nm and 5-30 nm. The micelle size depends on several factors, including copolymer composition, copolymer molar mass, solvent, temperature, and metal ion additive.

The amphiphilic copolymer forms a continuous polymer layer, i.e., a packed layer of spherical micelles, on a surface of the support layer. The polymer layer has a thickness between 5 nm to 10 μm, preferably below 5 μm, more preferably below 1 μm. It provides a charged membrane surface that selectively rejects charged compounds by electrostatic repulsion, thus minimizing fouling towards compounds having the same charge.

The polymer layer contains extremely small pores, which have a pore size of at most 50 nm on average, preferably smaller than the pores of the porous support layer. Preferably, the polymer layer contains no continuous pores larger than 10 nm that percolate throughout the layer. Typically, the polymer layer contains spherical micelles that are packed together and form charged pores, allowing water permeation through the interstices among the spherical micelles.

The spherical micelles can also form a multi-layered self-assembly structure, which provides two unexpected advantages: (1) as the core of each glassy micelles remains impervious and rigid, the self-assembly structure is more resistant to swelling effects and permits a higher flow rate without adversely affecting the selectivity of a membrane, compared to the conventional nanostructure of a copolymer used as a selective layer; and (2) this structure also offers much higher separation efficacy due to the proximity of all of the active sites, i.e. COOH functional groups, to the paths of solutes, resulting in more interaction between the solutes and the functional groups.

In addition, it is optional to include an additive such as a metal salt or an organic compound in the amphiphilic copolymer solution used for coating. Examples of the metal salt are, but not limited to a copper salt, a calcium salt, a magnesium salt, an iron salt, an aluminum salt, and a cadmium salt. Examples of the organic compound are, but not limited to a diamine and a polyamine Inclusion of a metal salt or an organic compound in the amphiphilic copolymer stabilizes the interactions between the charged groups and promotes self-assembly thereof. It also alters the pore size distribution, compared with the membrane without an additive.

A two-layer membrane containing a metal salt typically has a pure water permeance of 0.1 to 50 $Lm^{-2}h^{-1}bar^{-1}$, a NaCl rejection rate of 40 to 99.9%, a $Na_2SO_4$ rejection rate of 50 to 99.9%, a negative dye rejection rate of 60 to 99.9%, and a molecular weight cut-off below 30000 daltons. As an example, a two-layer membrane prepared from a copolymer solution containing a copper salt exhibits a pure water permeability of 1 to 10 $Lm^{-2}h^{-1}bar^{-1}$, a NaCl rejection of at least 70%, a $Na_2SO_4$ rejection of at least 80%, a negative dye rejection of at least 75%, and a molecular weight cut-off under 10000 daltons. The dye or salt rejection refers to the quantity in percentage of a dye or a salt removed from a nanofiltration feed. The higher the valence of co-ions (ions having the same charge as membrane) in the feed, the higher the rejection of the salt through the membrane. The higher the valence of counter-ions (ions having the opposite charge), the lower the rejection of the salt through the membrane. As such, among the four salts of $Na_2SO_4$, NaCl, $CaSO_4$, and $CaCl_2$, $Na_2SO_4$ has the highest rejection and $CaCl_2$ has the lowest.

The just-described two-layer membrane shows both high liquid permeability and high capability of retaining charged compounds for various applications including, among others, wastewater treatment, water softening, pharmaceuticals, and food industry.

This invention also relates to a process of filtering a liquid. The process includes (1) providing a two-layer membrane of this invention, which contains a polymer layer and a support layer; (2) directing the liquid through the two-layer membrane, first through the polymer layer and then through the support layer; and (3) collecting the liquid that permeates through the two-layer membrane.

This process for liquid filtration can be used to fractionate two water-soluble organic molecules of different sizes and/or charges, e.g., proteins and peptides, and remove contaminants of low concentrations by absorption onto the polymer layer.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever.

EXAMPLE 1

Synthesis of poly(trifluoroethyl methacrylate-r-methacrylic acid) ("PTFEMA-r-MAA") copolymers Random copolymers formed of two monomers, hydrophobic trifluoroethyl methacrylate ("TFEMA") and negatively charged methacrylic acid ("MAA"), were synthesized as follows. TFEMA (Scientific Polymer) was passed through a column of basic Alumina (Sigma Aldrich) to remove an inhibitor therein. MAA (Sigma Aldrich) was passed through a neutral alumina column (Sigma Aldrich) to remove an inhibitor therein. For each copolymer, the two monomers totaling 10 g and dimethyl sulfoxide (DMSO, 30 mL) were placed in a round bottom flask having a magnetic stirrer. Monomer ratios were adjusted to provide copolymers having different compositions shown in Table 1 below. Azobisisobutyronitrile (AIBN, 0.005 g, Aldrich) was then added into the flask to initiate the co-polymerization of the two monomers. The flask was sealed with a rubber septum and nitrogen was bubbled through the reaction mixture for 30 minutes to purge any dissolved oxygen. The flask was then kept at 55° C. while stirring for about 4 hours. 4-Methoxyphenol (MEHQ, 0.5 g) was added to terminate the reaction thereafter. The reaction mixture was observed to be viscous and additional amount (e.g., 30 mL) of DMSO was added to dilute the solution. The copolymer was then precipitated in a solution of ethanol and hexane (1 to 3 volume ratio, respectively) and washed 3 times using fresh solvents of ethanol and hexane. The final polymers were obtained by air-drying the PTFEMA-r-MAA copolymers thus formed, i.e., CP30, CP40, and CP50, overnight followed by drying in a vacuum oven at 50° C. overnight.

EXAMPLE 2

Characterization of Copolymer Composition, Molar Mass, and Water Uptake

The copolymers prepared in EXAMPLE 1 were characterized by $^1$H Nuclear Magnetic Resonance ($^1$H NMR) spectroscopy. After dissolving the copolymers in DMSO-d$_6$, NMR spectra were acquired on a Bruker Avance III 500 spectrometer. The composition of each copolymer was determined by calculating the ratio of the characteristic peaks' integration in $^1$H NMR spectra from protons in each monomer. Each of the copolymers was determined to contain about 30-55 wt % MAA, as listed in Table 1.

TABLE 1

Copolymers of different compositions

| Copolymer code | MAA (wt %) |
|---|---|
| CP30 | 30 |
| CP40 | 45 |
| CP50 | 55 |

Molecular weight distribution of the copolymers described in EXAMPLE 1 were measured by a Shimadzu Gel Permeation Chromatography (GPC) System equipped with a TOSOH TSKgel GMHh-M mixed-bed column, guard column, and both UV and refractive index detectors. Tetrahydrofuran was used as the mobile phase eluting at a rate of 0.75 mL/min and calibrated with a low polydispersity poly (styrene) standard (TOSOH, PSt Quick Kit). GPC analysis showed formation of a high molecular weight copolymer (weight-average molecular weight of Mw=1000 kg mol$^{-1}$) with a dispersity (Đ) of 1.75, an indication of free radical polymerization.

Water uptake was measured for copolymers with different compositions. Dry samples ($W_{dry}$) were equilibrated in deionized water for two days at room temperature. Excess water was removed using a filter paper and weighed immediately ($W_{wet}$). Table 2 below shows the water uptake for different copolymers, which were calculated from the weight difference of a polymer at its hydrated and dry state according to Equation 1:

$$\text{Water uptake \%} = \frac{W_{wet} - W_{dry}}{W_{dry}} \times 100 \quad \text{Equation 1}$$

TABLE 2

Water uptake % for copolymers of different compositions

| Copolymer code | Water Uptake % |
|---|---|
| CP30 | 23 ± 2 |
| CP40 | 26 ± 3 |
| CP50 | 51 ± 7 |

EXAMPLE 3

Preparation of Membrane Casting Solutions Containing Spherical Micelles

A solution containing 5 wt % of the copolymer obtained in EXAMPLE 1 was prepared by dissolving it in methanol, heating and stirring the resulting solution at 40° C. for 24 hours. The solution thus prepared was then passed through a 1-micrometer glass fiber syringe filter (Whatman) and degassed in a vacuum oven for at least 2 hours.

It was observed that spherical micelles were formed upon dissolving the copolymer in methanol. The hydrophilic parts of the polymer chain, formed from the segments of MAA repeat units, were located at the interface between the micelles and the solvent, and the hydrophobic parts, formed from the segments of PTFEMA repeat units, were located in the interior of each micelle. The presence of micelles in the solution was confirmed by Dynamic Light Scattering (DLS, Brookhaven instrument).

A 0.5 wt % of copolymer solution in methanol was used for DLS analysis after filtering the solution through a 0.45 μm PTFE, filter to remove dust. Results were then analyzed with Non Negative Least Square (NNLS) method. DLS showed a micelle size of about 15.14±0.22 nm and polydispersity of about 0.184.

A solution of 5 wt % CP40 in methanol was prepared and copper acetate (Cu(OAc)2) was added to the solution (1:20 mol ratio of Cu:MAA), and DLS shows larger micelle sizes when Cu was present in the solution. DLS showed a micelle size of about 19.12±0.12 nm and polydispersity of about 0.154.

The presence of micelles was also confirmed by transmission electron microscopy (TEM). A solution of 0.3 wt % CP40 copolymer in methanol was coated onto a TEM grid and the grid submerged in deionized (DI) water for 5 minutes, and stained by dipping into a 0.5 wt % aqueous solution of $Cu(OAc)_2$ (1:20 mol ratio of Cu:MAA). $Cu^{2+}$ ions specifically interact with carboxylic acid groups on micelle shell (darker area around micelles). TEM image also showed the polydisperse micelles on the film.

EXAMPLE 4

Preparation of Thin Film Composite (TFC) Membranes

TFC membranes were prepared by coating the solutions of the copolymers described in EXAMPLE 3 on the surface of a commercial porous membrane ("support layer") as follows.

A commercial polyacrylonitrile membrane (PAN 400, Nanostone Inc.), an ultrafiltration membrane, was used as the support layer. To prepare membranes from copolymer solutions without additives, a thin layer of each copolymer solution (5 wt % copolymer CP30, CP40, or CP50 in methanol) was coated on the ultrafiltration membrane using a doctor blade with a gap of 20 microns. The solvent was allowed to evaporate for approximately 20 s. The coated membrane was then immersed into a DI water bath at room temperature. The TFC membranes thus prepared were kept in DI water for at least overnight before testing.

TFC membranes that contained copper were also prepared from mixtures of the copolymers described in EXAMPLE 1 and copper acetate. Copolymer solutions containing 5 wt % copolymers were prepared in the same manner as discussed above. Copper acetate was then added to each solution so that the molar ratio of copper ions to MAA repeat units was 1:20 (i.e., 0.25 wt % copper acetate and 5 wt % copolymer in methanol). The resulting solution was coated on a surface of a support layer in the same way as described above to produce a two-layer PTFEMA-r-MAA membrane containing copper acetate.

For scanning electron microscopy (SEM) analysis, each membrane was freeze-fractured in liquid nitrogen and imaged on a cross-section. The polymer layer thickness of all membranes thus prepared was about 400 nm.

EXAMPLE 5

Membrane Surface Chemistry Analysis

Membranes prepared using the above-described copolymers of three different compositions in the absence of copper acetate were characterized by Attenuated Total Reflection-Fourier Transform InfraRed (ATR-FTIR) spectroscopy. The spectra were acquired using a Jasco FT/IR-6200 spectrophotometer. Prior to analysis, membranes were air-dried for 24 hours. The ATR-FTIR spectra were recorded over the range of 4000-600 $cm^{-1}$ at a 2 $cm^{-1}$ resolution. Deconvolution of the peaks was done by using Fityk software.

The spectra exhibited characteristic peaks at 1700 $cm^{-1}$ for carboxyl groups from MAA repeat units and at 1730 $cm^{-1}$ for ester groups from TFEMA repeat units. The ratio of these two peaks was found to match the weight ratio of the two repeat units in the copolymers. Also, copolymers with a higher MAA content showed stronger carboxyl peaks. More specifically, copolymer CP30 exhibited a carboxyl-to-ester peak ratio of 0.65, copolymer CP40 exhibited a carboxyl-to-ester peak ratio of 1.0, and copolymer CP50 exhibited a carboxyl-to-ester peak ratio of 1.7.

EXAMPLE 6

Membrane Hydrophilicity Measurements

Membrane hydrophilicity was measured with a Ramé-Hart contact angle goniometer. A dry membrane, cut and taped onto a glass plate, was used for contact angle measurement. Table 3 below shows the sessile drop contact angle measurements for membranes of different compositions. The contact angle of CP50, which contained more MAA repeat units in the copolymer, was found to be smaller than that of CP40.

The results indicate that membrane hydrophilicity increased as the amount of the hydrophilic monomer (MAA) in the copolymer was increased.

TABLE 3

| Membrane contact angle | |
|---|---|
| Membrane composition | Contact Angle |
| CP40 | 82 ± 3 |
| CP50 | 69 ± 4 |

EXAMPLE 7

Membrane Microstructure Evaluation

Membranes were fabricated from three copolymers as described in EXAMPLE 4. The microstructures of the membranes were characterized by Supra 55 FE-SEM at 4 kV and 6 mm working distance. The membranes were dried and frozen in liquid nitrogen and cut with a razor blade for cross-sectional imaging. They were sputter-coated with 3 nm of Au/Pd to prevent charging.

Both cross-section and surface images of two membranes, i.e., the support layer and the TFC membrane made by coating CP40 onto the support layer, were obtained. See FIGS. 1a-1f. Cross-section images of the TFC membrane showed a ~400 nm thick selective layer composed of a packed array of spherical micelles, formed from the copolymer in a solution, on top of the porous support layer. The spaces between micelles provided the path for transport of solutes through the selective layer. The micelle size was confirmed by DLS.

Figure 2:
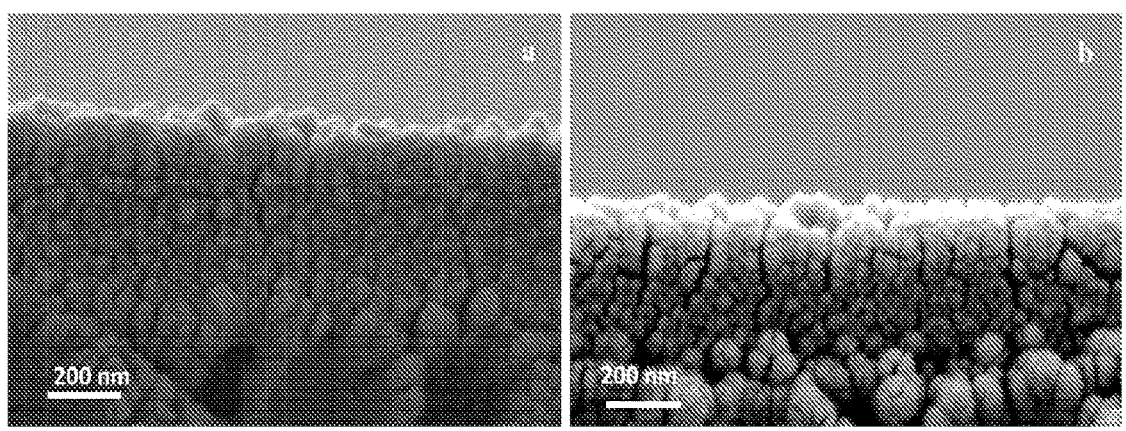
FIG. 2 shows images of selective layers, each on a base membrane, prepared from (a) copolymer CP50 and (b) both copolymer CP40 and 1:20 molar ratio of $Cu(OAc)_2$.

Membrane prepared from copolymer CP50 showed larger micelle size in comparison to that from copolymer CP40. See FIG. 2a. Also investigated was effect of addition of $Cu(OAc)_2$ to a casting solution with the molar ratio of 1:20 to MAA on the membrane structure. It was observed that addition of Cu improved arranging micelles via its complexation with MAA segments at the top of the selective layer. The FE-SEM image of the cross-section of the membrane with Cu is shown in FIG. 2b.

Figure 3:
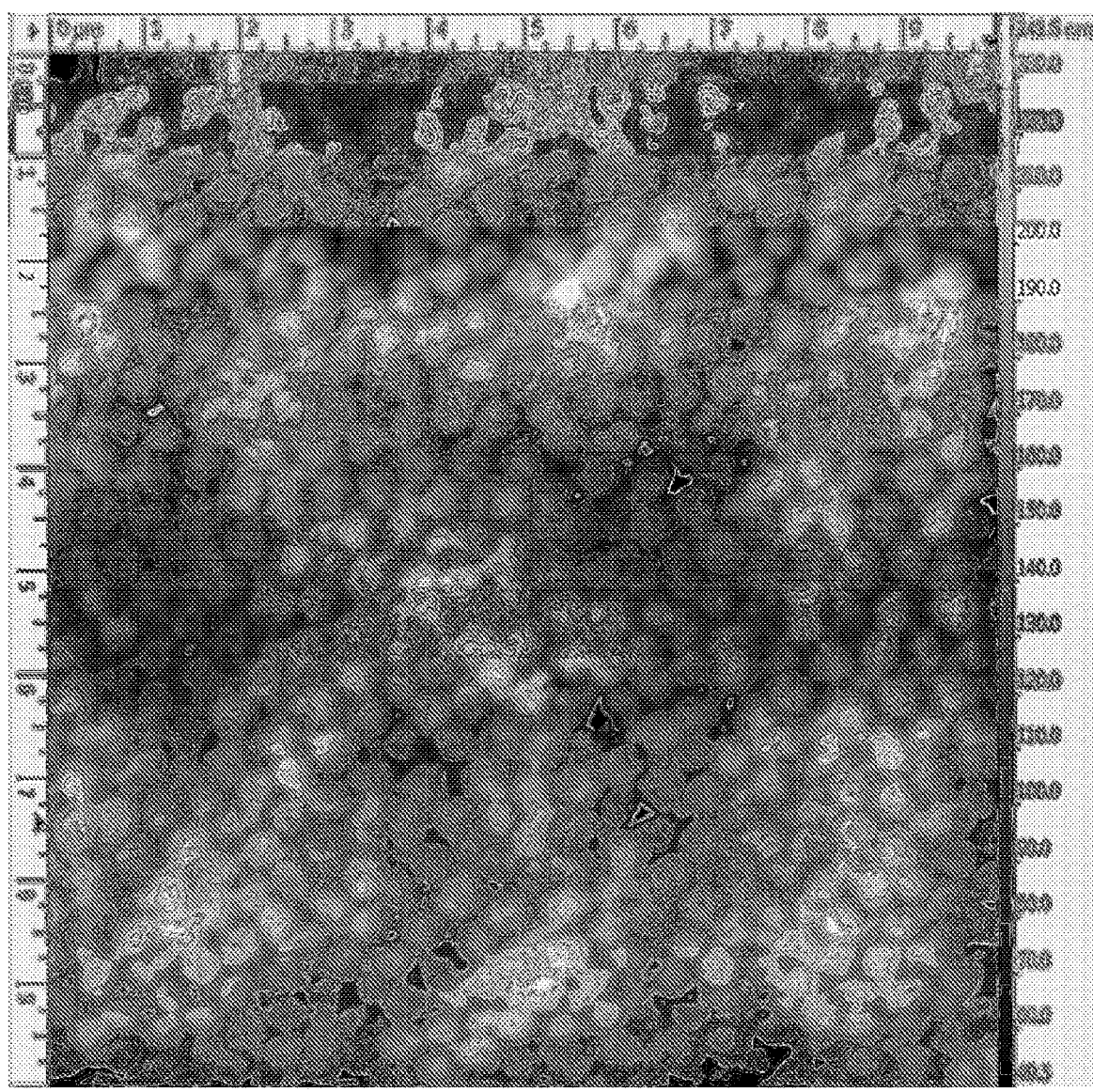
FIG. 3 shows a height image of a membrane prepared from copolymer CP40.

The structures of packed micelles on the membrane surface were also observed by Atomic Force Microscopy (AFM). See FIG. 3. The height image of the two-layer membrane prepared from copolymer CP40 showed a packed array of spherical micelles.

EXAMPLE 8

Water Permeability of Membranes Containing Different Copolymers

Pure water fluxes through the membranes prepared in EXAMPLE 4 were evaluated using an Amicon 8010 stirred, dead-end filtration cell (Millipore) with a cell volume of 10 mL and an effective filtration area of 4.1 $cm^2$. The cell was stirred at 500 rpm and the test was performed at 40 psi. Transmembrane fluxes were measured by collecting the permeate in a container placed on top of a scale and observing the total weight increase over time.

The membrane permeance ($L_p$) was calculated by normalizing flux (J) with applied transmembrane-pressure ($\Delta P$) according to Equation 2:

$$L_P = \frac{J}{\Delta P} = \frac{1}{R_{total}} \quad \text{Equation 2}$$

Note that $R_{total}$ represents the resistance toward the flow of the selective layer and the support layer itself. A resistance-in-series model was used to account for the hydraulic resistance posed by the support layer and the selective layer ($R_{total}=R_{selective\ layer}+R_{support\ layer}$). The support layer resistance against the flow was negligible due to its high flux in comparison to the TFC membrane (e.g., 820 L·m$^{-2}$·h$^{-1}$·bar$^{-1}$).

Selective layer permeability ($P_m$) was calculated by normalizing the permeance with the selective layer thickness according to Equation 3:

$$P_m = \frac{\delta}{R_{selective\ layer}} \quad \text{Equation 3}$$

Note that $\delta$ is the selective layer thickness (μm) and obtained using ImageJ software. The value was averaged from at least 5 different membrane samples.

The selective layer permeability of the three copolymers, calculated as described above from DI water filtration experiments, were recorded. Both CP40 and CP50 TFC membranes showed high selective layer permeability values in comparison to currently available nanofiltration membranes, whose selective layer permeabilities are typically in the range of 0.05-0.3 L·μm/m$^2$·h·bar. See Zhou et al., Journal of the American Chemical Society, 2007, 129(31), 9574-9575.

Furthermore, it was observed that membrane selective layer permeability increased as the MAA content in the copolymer was increased. More specifically, the membrane formed from copolymer CP30 exhibited selective layer permeability of about 0.5 L·μm/m$^2$·h·bar, the membrane formed from copolymer CP40 exhibited selective layer permeability of about 1.2 L·μm/m$^2$·h·bar, and the membrane formed from copolymer CP50 exhibited selective layer permeability of about 3.8 L·μm/m$^2$·h·bar.

The two two-layer membranes containing copper acetate were found to have higher pure water permeances than those of the membranes not containing copper acetate. For example, the membrane having 5 wt % of copolymer containing copper acetate showed a pure water permeance of 8-9 Lm$^{-2}$h$^{-1}$bar$^{-1}$, compared with 3-4 Lm$^{-2}$h$^{-1}$bar$^{-1}$ for its counterpart not containing copper acetate.

The selection of polymer concentration and porous support layer was found to affect the structure of the membrane significantly. For example, a higher polymer concentration (>8 wt %) resulted in low membrane permeability. On the other hand, the multi-layered micelle structure was not seen when the support layer had a high MWCO, as the surface pore size was too large for the micelles to stay on the membrane surface to form a selective layer. In that case, the micelles went inside the pores and clogged the membranes, resulting in a very low permeability (<0.1 L/m$^2$·h·bar)

EXAMPLE 9

Diffusivity of Organic Solutes Through Membranes of Different Copolymers

A 1-inch diameter swatch of the membrane of interest (support layer or two-layer membrane with CP40 or CP50 selective layer) was mounted between the halves of a diffusion cell consisting of two compartments (7.0 mL each), i.e., a feed compartment and a sink compartment. The effective permeation area was 1.8 cm$^2$. A 0.1 mM solution of a selected organic solute (e.g. dye) was placed into the feed compartment, whereas the sink compartment was filled with DI water. Solutions in both compartments were continuously stirred to minimize concentration polarization. A 1 mL sample was removed from the sink compartment periodically, and replaced with fresh DI water. The concentration of the solute in the sample was measured by UV-Visible spectrometry. Molar flux of the solute across the membrane was calculated using a mass balance, from the slope of the plot of number of moles of transported solute versus time.

To investigate the ability of the membranes to separate organic molecules by electrostatic charge, three dyes were selected as solutes: Basic Blue 3 (BB), a dye with a +3 net charge; riboflavin, a neutral solute; and Methyl Orange (MO), a dye with a net (−1) charge. The two charged molecules are similar in size and structure, as well as solubility, but are oppositely charged. Selectivity coefficients (α) are defined as the ratio of cations (higher flux) to anions:

$\alpha_{+/-}=J_{BB3+}/J_{MO-}$, where $J_{BB3+}$ and $J_{MO-}$ are the molar fluxes of BB and MO, respectively.

As shown in Table 4 below, the separation factor $\alpha_{+/-}$ for the support layer (PAN 400, nanostone) was 1.10 indicating almost no selectivity. The separation factor $\alpha_{+/-}$ for the two-layer membrane with a CP40 selective layer was as high as 24.4. The positive dye diffused with delay initially due to adsorption, then diffused with a much faster rate than the anionic molecule. Small pores and high charge density contributed to the high separation efficiency.

Changing the copolymer composition can potentially alter both the sizes of the micelles and hence the sizes of the inter-micellar spaces that serve as pores, and also alter the density of charged functional groups in the membrane selective layer. Both factors can have a great effect on the diffusion rate of both positively and negatively charged species, increasing the diffusion rates of both desired and undesired solutes.

Indeed, the membrane formed from copolymer CP50 showed that the flux of positively charged dye increased more than 5 times and that of MO increased about 30 times, leading to a decreased α of 4.8.

TABLE 4

Selectivity coefficient of different membranes

| Membrane code | Flux of molecules (nmol/cm$^2$min) | | Selectivity coefficient, α |
|---|---|---|---|
| | Basic Blue 3 | Methyl Orange | |
| Support layer | 0.094 | 0.08488 | 1.1 |
| CP40 | 0.005 | 0.0002 | 24.3 |
| CP50 | 0.028 | 0.0058 | 4.8 |

EXAMPLE 10

Filtration and Rejection of Organic Molecules

Rejection of organic molecules by the two-layer membranes prepared in Example 4 was evaluated as follows. Different aqueous dye solutions (Brilliant Blue R, Calcein sodium salt, Acid blue 45, Methyl Orange, Vitamin B12, Rutin hydrate, Riboflavin, Rhodamine B, Basic Blue 3) were prepared at a concentration of 0.1 mM. Sizes of dye molecules were calculated using Molecular Modeling Pro software (ChemSW).

The rejection study was performed following the filtration procedure described in EXAMPLE 3. The membranes were first equilibrated by filtering DI water through them for at least 1 hour. A dye solution was placed in the filtration cell, and the pressure for this study was set to 40 psi. The first 1 mL of the filtrate was discarded to reach steady-state, and the subsequent 1 mL was collected and used for measuring the dye concentration in the permeate. Dye rejection was calculated according to Equation 4:

$$R\% = \left(1 - \frac{C_P}{C_F}\right) \times 100 \qquad \text{Equation 4}$$

Note that R is the solute rejection, $C_F$ and $C_P$ are the concentration of feed (0.1 mM) and permeate, respectively. Concentrations of dye solutions were measured by a UV-Vis spectroscopy (Thermo Scientific Genesys 10S). The data shows the average of at least four membrane samples from different sheets.

In aqueous solution, the membrane pore walls are electrically charged due to deprotonation of carboxyl groups. This charge induces the formation of an electrical double layer (EDL) inside the nano pores according to Poisson-Boltzmann equation. This causes electrostatic exclusion of co-ions and enrichment of counter-ions within the thickness of EDL, subsequently affecting permselectivity to ionic species. The extent of this enrichment-depletion effect directly depends on channel diameter and Debye length ($\lambda_D$). At far enough distance from the pore wall, the net charge would be zero, and solutes can pass without being repelled by co-ions. If the pore diameter is smaller than double the electrical double layer thickness, the passage of co-ions would be constrained through the membrane owing to electrostatic repulsion. Although the double layer overlap is not necessary for selective ion transport through the membrane, it can confer the membrane selectivity to charged species inside the pores.

Figure 4:
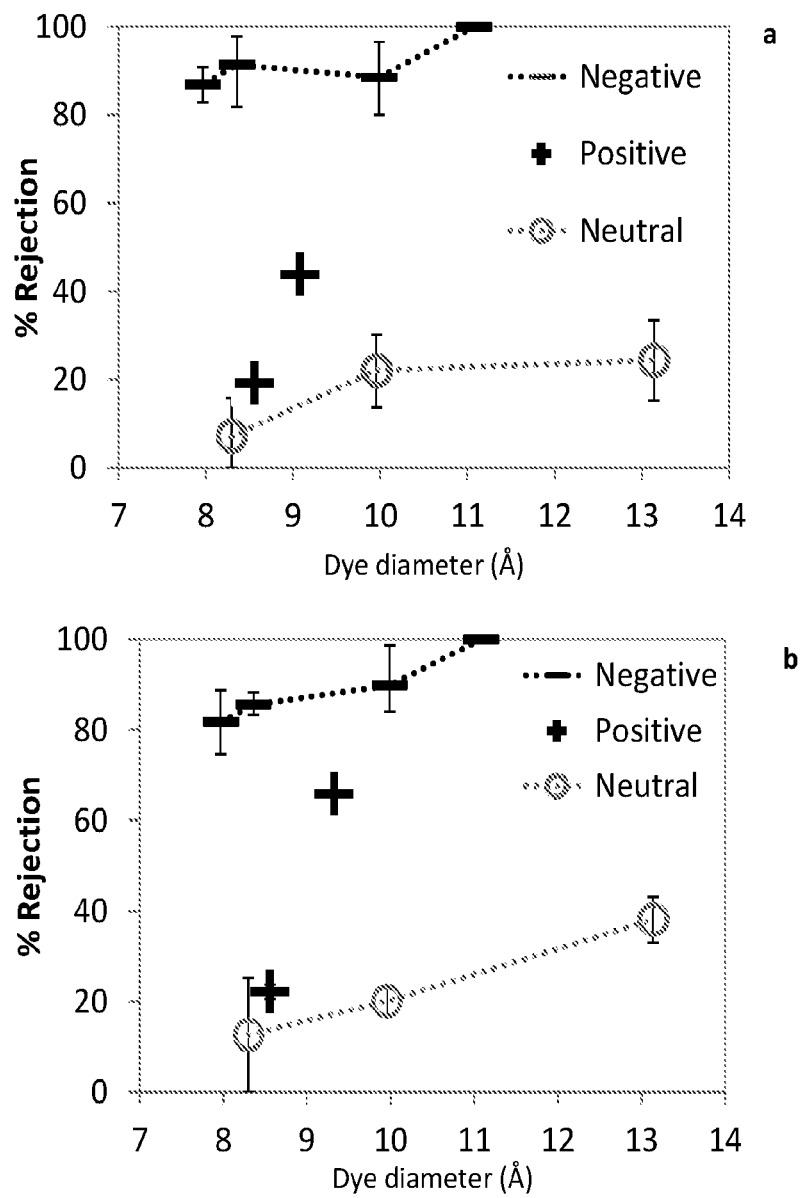
FIG. 4 shows rejection of dyes by two-layer membranes prepared from (a) copolymer CP40 and (b) copolymer CP50.

As shown in FIGS. 4a and 4b, ionic/charged solute permeation was heavily affected by electrostatic interactions. Large cationic or neutral species permeated through the membrane whereas even much smaller anionic solutes were retained. Charge-based selectivity between a (+) and a (−) charged solute of similar size was higher when both solutes are small (e.g., BB vs. MO) than when both solutes are large (e.g., Rhodamine B vs. Calcein). This indicates that size sieving played a role for the larger solute pair, demonstrated by an increasing rejection of neutral solutes in this size range. The membrane pore size based on FESEM imaging was larger than the size of solutes used in the study, but sieving effects played a role due to the partial swelling of the micelles in water, and hindered diffusion during the passage through the membrane. Larger molecules experienced greater molecular friction with the pore walls and thus greater hindrance and higher rejection. For neutral solutes, data shows that larger molecules (e.g., Vitamin B12) were retained more than smaller solutes (e.g., Riboflavin and Rutin hydrate).

The results set forth above show that the two-layer membrane of this invention was capable of separating anionic and neutral species.

EXAMPLE 11

Efficacy of a Membrane for Separation of Dye Molecules Based on Charge

Figure 5:
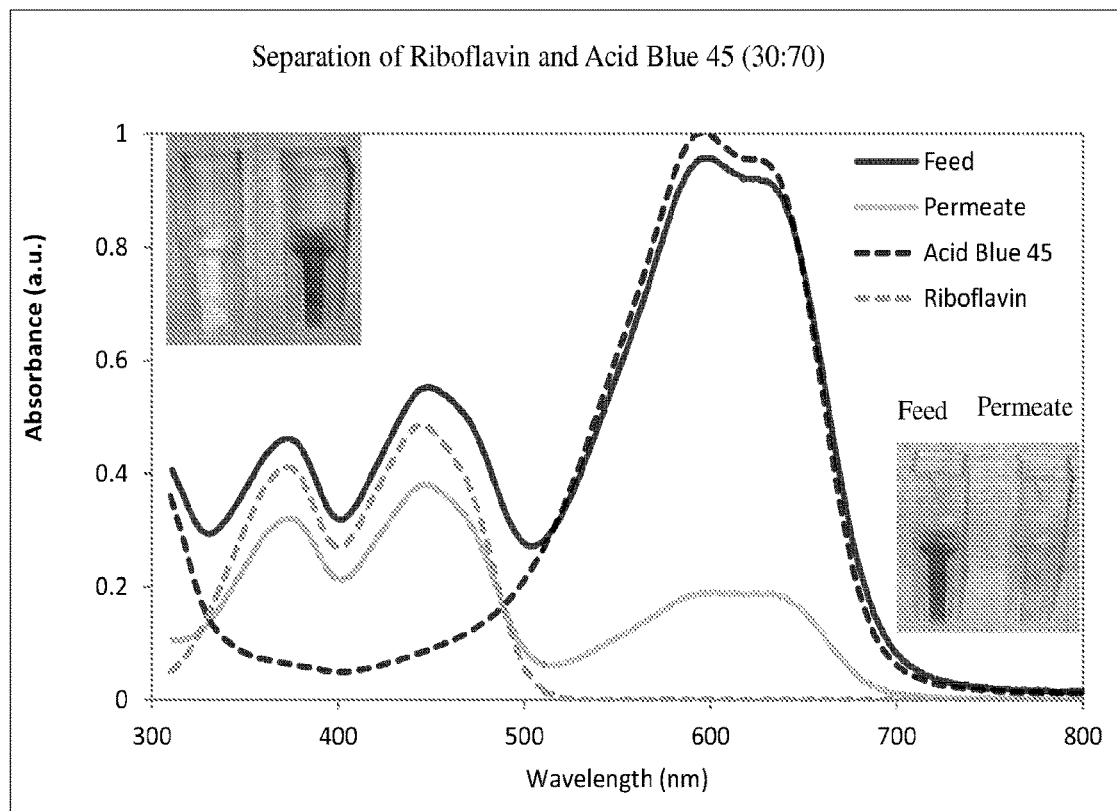
FIG. 5 shows separation performance of a CP50 membrane for (a) Acid Blue 45 and riboflavin, and (b) Brilliant Blue R and Vitamin B12.
Figure 5:
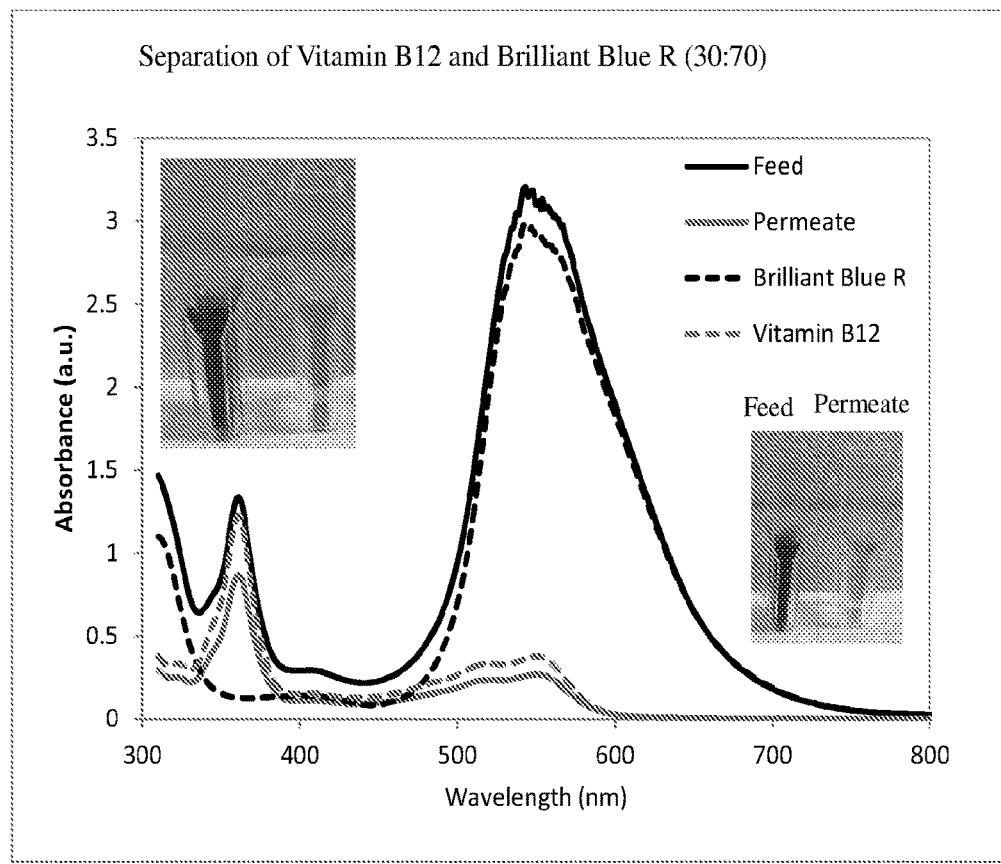

A study was performed to use a membrane formed from copolymer CP50 for separating two solutes with similar size but different charge. Results for separating two pairs of dyes, i.e., Acid Blue 45/Riboflavin and Brilliant blue R/Vitamin B12, are shown in FIG. 5. UV-visible spectra of each dye, the feed containing equal concentrations of each dye, and the permeate were collected. The absorptivity of each dye was calculated at each characteristic wavelength, and used to calculate the rejection of each solute in the mixture. The rejection values are listed in Table 5 below. Unexpectedly, both the two-layer membranes described above, i.e., the CP40 membrane and the CP50 membrane, efficiently separated these pairs of organic compounds of similar molecular size. The separation efficiency was better for the larger dye pair (Vitamin B12 and Brilliant Blue), as the charged dye was almost completely retained.

TABLE 5

Rejection % of CP40 and CP50 membranes for multi-compononet filtration

| Dyes | Rejection % CP40 | Rejection % CP50 |
|---|---|---|
| Riboflavin (8.3 A, 0) | 22.5 | 6.8 |
| Acid Blue 45 (8.3 A, −2) | 96.5 | 81.1 |
| Vitamin B12 (13.1 A, 0) | 25.1 | 39.6 |
| Brilliant Blue R (11.1 A, −1) | 98.33 | 98.6 |

EXAMPLE 12

Effect of Ionic Strength on Rejection of Dyes

A study was performed to evaluate the effect of ionic strength on dye rejection using a CP40 membrane as follows. Solutions of dyes were prepared in different sodium chloride concentrations of 10 and 100 mM corresponding to a Debye length of 3.04 nm and 0.961 nm (calculated according to Equation 1), respectively. According to Gouy-Chapman theory, the Debye length was calculated according to Equation 5:

$$\lambda_D = \sqrt{\frac{\varepsilon_0 \varepsilon_r k_B T}{2 N_A e^2 I}} \qquad \text{Equation 5}$$

Note that $\varepsilon_0$ and $\varepsilon_r$ are the vacuum and relative permittivity, respectively; $k_B$ is the Boltzmann constant, T is the absolute temperature and e is the elementary charge, $N_A$ is the Avogadro number and I is the ionic strength of the solution.

Figure 6:
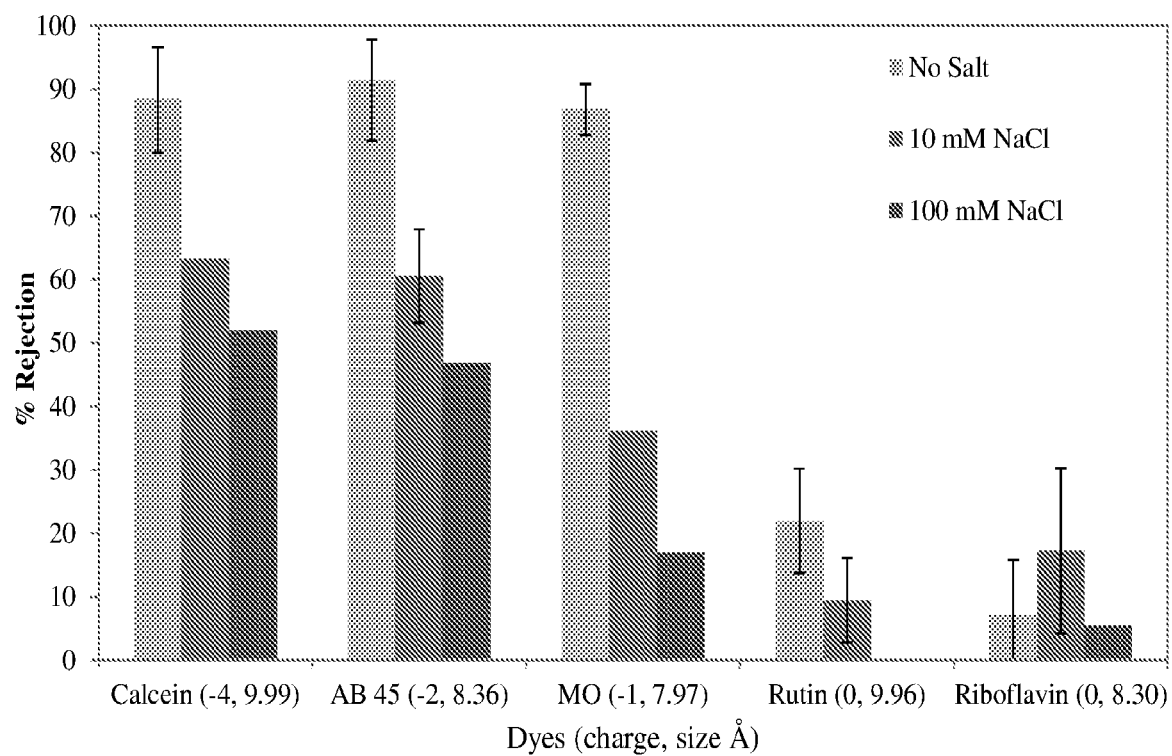
FIG. 6 shows the effect of ionic strength on dye rejection for a CP40 membrane.

Rejection of some of the dyes described above was measured in solutions in which ionic strength was adjusted by adding NaCl. As shown in FIG. 6, it was observed that the rejection of three negatively charged dyes decreased significantly upon the addition of salt to the feed, decreasing the EDL thickness and reducing charge-based rejection. The rejection of neutral solutes riboflavin and rutin remained relatively unchanged.

EXAMPLE 13

Rejection of Salts with Different Valences

A study was performed to evaluate the effect of valence among salts $Na_2SO_4$, NaCl, $CaSO_4$, and $CaCl_2$ on rejections using the two-layer membrane. The rejection of salts by the membrane prepared in EXAMPLE 4 was evaluated as follows.

Salt retention experiments were carried out by dissolving salts of different concentrations (1, 5, and 10 mM) in DI water (1 µS conductivity). 2 mL of the filtrate was collected after the first 1 mL was discarded. The conductivity of the solution was measured using a conductivity meter (Traceable® Expanded Range Conductivity Meter, VWR). The rejections were calculated using Equation 4 described above.

Filtration experiments of 1 mM salt solutions showed $Na_2SO_4$ rejection as high as 90%, NaCl rejection about 70%, $CaSO_4$ rejection about 60%, and $CaCl_2$ rejection about 40%.

These results show that electrostatic interactions due to various valences had an effect on the salt rejection of the two-layer membrane of this invention.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A two-layer nanofiltration membrane, the membrane comprising:
   a polymer layer having a pore size of at most 50 nm and a thickness of 5 nm to 10 µm, comprising a random amphiphilic copolymer comprising a plurality of a first type of repeat unit and a plurality of a second type of repeat unit; and
   a support layer having a pore size of 3 nm to 10 µm, wherein the pore size of the support layer is larger than the pore size of the polymer layer,
   wherein:
   the polymer layer is a packed layer of spherical micelles each having a size of 5-200 nm;
   the polymer layer is disposed on a surface of the support layer;
   25-75 wt % of the amphiphilic copolymer is the first type of repeat unit;
   the first type of repeat unit is methacrylic acid; and
   the second type of repeat unit is trifluoroethyl methacrylate.

2. The two-layer membrane of claim 1, wherein the amphiphilic copolymer has a molecular weight of 20,000 to 3,000,000 daltons.

3. The two-layer membrane of claim 2, wherein the amphiphilic copolymer has a molecular weight of at least 40,000 daltons.

4. The two-layer membrane of claim 3, wherein the amphiphilic copolymer has a molecular weight of at least 100,000 daltons.

5. The two-layer membrane of claim 2, wherein the polymer layer has a thickness of at most 5 µm.

6. The two-layer membrane of claim 5, wherein the polymer layer has a thickness of at most 1 µm.

7. The two-layer membrane of claim 5, wherein the polymer layer has a pore size of at most 30 nm.

8. The two-layer membrane of claim 7, wherein the polymer layer has a pore size of at most 10 nm.

9. The two-layer membrane of claim 2, wherein the amphiphilic copolymer has a molecular weight of at least 100,000 daltons, and the polymer layer has a thickness of at most 1 µm and a pore size of at most 10 nm.

10. The two-layer membrane of claim 1, wherein the amphiphilic copolymer comprises a metal salt.

11. The two-layer membrane of claim 10, wherein the metal salt is a copper salt.

12. The two-layer membrane of claim 1, wherein the amphiphilic copolymer further comprises an organic compound for interacting with the one or more charged groups.

13. The two-layer membrane of claim 12, wherein the organic compound is a diamine or a polyamine.

14. The two-layer membrane of claim 1, wherein the amphiphilic copolymer has a molecular weight of 100,000 to 3,000,000 daltons, a thickness of at most 1 µm, and a pore size of at most 10 nm.

15. The two-layer membrane of claim 14, wherein the amphiphilic copolymer comprises a copper salt.

16. The two-layer membrane of claim 15, wherein the two-layer membrane has a pure water permeance of 0.1 to 10 $Lm^{-2}h^{-1}bar^{-1}$, a NaCl rejection of 40 to 99.9%, a $Na_2SO_4$ rejection of 50 to 99.9%, a negative dye rejection of 60 to 99.9%, and a molecular weight cut-off below 10,000 daltons.

17. A process of filtering a liquid, the process comprising:
   providing a two-layer membrane of claim 1;
   directing the liquid through the two-layer membrane, wherein the liquid first passes through the polymer layer and then passes through the support layer; and
   collecting the liquid that permeates through the two-layer membrane.

18. The process of claim 17, wherein the amphiphilic copolymer has a molecular weight of 100,000 to 3,000,000 daltons, and the polymer layer has a thickness of at most 1 µm and a pore size of at most 10 nm.

19. The process of claim 18, wherein the amphiphilic copolymer comprises a copper salt.

20. The process of claim 19, wherein the two-layer membrane has a pure water permeance of 0.1 to 10 $Lm^{-2}h^{-1}bar^{-1}$, a NaCl rejection of 40 to 99.9%, a $Na_2SO_4$ rejection of 50 to 99.9%, a negative dye rejection of 60 to 99.9%, and a molecular weight cut-off below 10,000 daltons.

* * * * *